United States Patent [19]

Rines

[11] 4,447,896

[45] May 8, 1984

[54] METHOD OF AND APPARATUS FOR COMBINED OPTICAL AND SONAR DETECTION AND RECORDING OF OBJECTS

[75] Inventor: Robert H. Rines, Concord, N.H.

[73] Assignee: The Academy of Applied Science, Inc., Belmont, Mass.

[21] Appl. No.: 277,655

[22] Filed: Jun. 26, 1981

[51] Int. Cl.³ .......................... G01S 15/88; G01S 7/60
[52] U.S. Cl. ......................................... 367/96; 354/64; 354/76
[58] Field of Search ....................... 367/96; 354/64, 75, 354/76, 126, 145, 266; 343/6 R, 6 TV

[56] References Cited

U.S. PATENT DOCUMENTS

| | | | |
|---|---|---|---|
| 2,872,622 | 2/1959 | Edgerton | 315/157 |
| 4,105,990 | 8/1978 | Rines et al. | 367/96 |
| 4,121,190 | 10/1978 | Edgerton et al. | 367/106 |
| 4,335,944 | 6/1982 | Marshall | 367/96 X |

OTHER PUBLICATIONS

Rines et al., "Search for the Loch Ness Monster", Technology Review, Mar./Apr. 1976, pp. 25-40.
Edgerton et al., "An Elapsed-Time Photographic System for Underwater Use: Proc. of the 8th Internat'l Congress on High Speed Photo," John Wiley and Sons, 1968.

Primary Examiner—Richard A. Farley
Attorney, Agent, or Firm—Rines and Rines, Shapiro and Shapiro

[57] ABSTRACT

This disclosure is concerned with problems of energy conservation and more effective utilization at desired critical times only in, for example, sonar-triggered underwater elapsed time strobe photography of objects or scenes or in applications having similar problems; accomplishing such and other ends by restricting optical and sonar monitoring to relatively low periodicity intervals until the desired object has come within range, whereupon the apparatus automatically changes mode to take rapid successive strobe photographs or other records supplemented by contemporaneous sonar recording.

29 Claims, 1 Drawing Figure

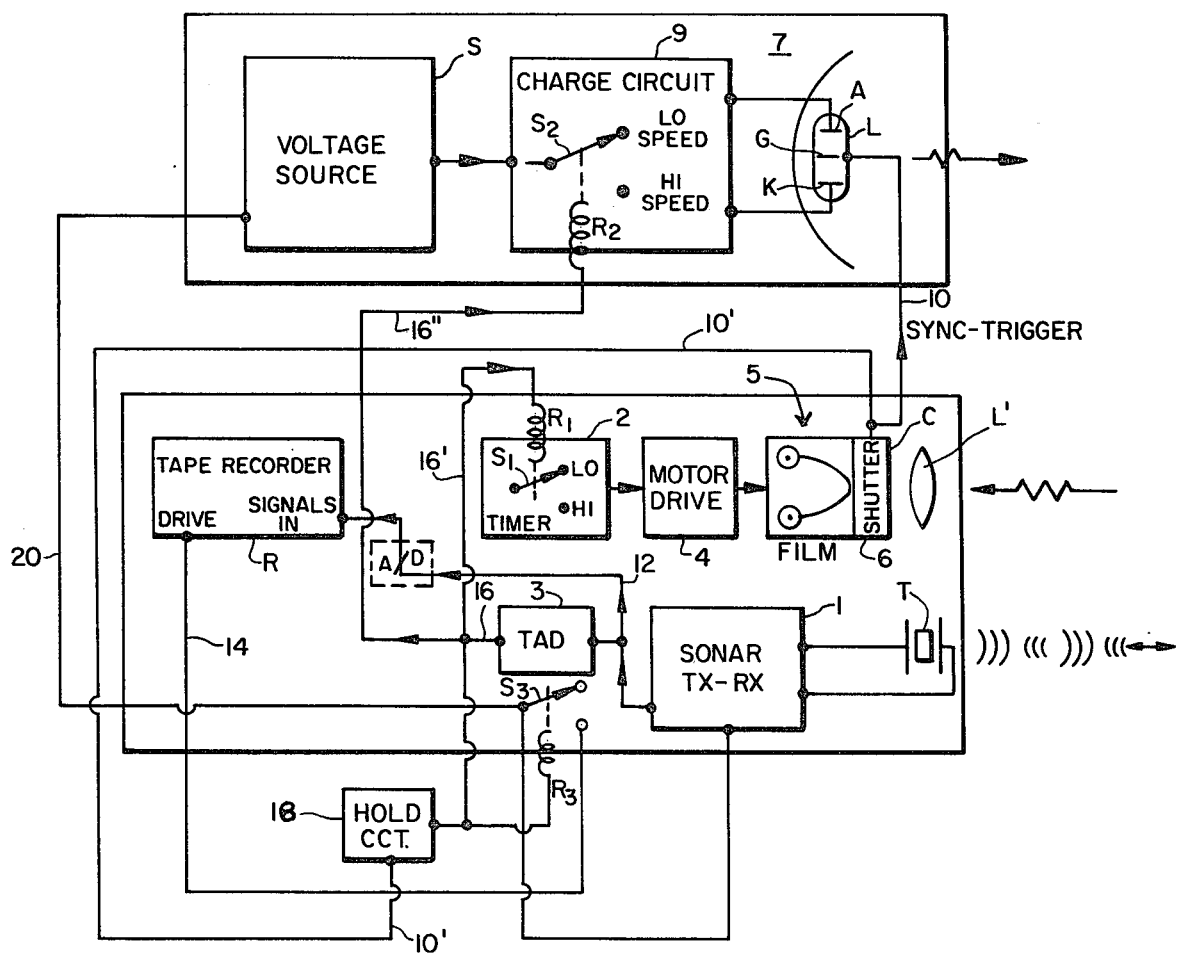

METHOD OF AND APPARATUS FOR COMBINED OPTICAL AND SONAR DETECTION AND RECORDING OF OBJECTS

The present invention relates to combined optical (such as photographic or video) and acoustical (such as sonar) monitoring; being more particularly though not exclusively directed to sonar-triggered or-controlled cameras, including underwater elapsed time strobe cameras and the like, for monitoring objects or scenes.

In underwater applications, for example, as in searching for objects of particular characteristics, it is helpful to use substantially simultaneous or contemporaneous light and acoustic energy not only to provide correlative information, but to take advantage of the beneficial longer range searching properties of longer-wavelength acoustical energy, and the beneficial finer definition properties of shorter wavelength light waves. Applications, including searching for the animal life of Loch Ness, are discussed in my earlier U.S. Pat. No. 4,105,990 and the references cited therein, where highly effective equipment is disclosed utilizing the sonar to trigger the strobe cameras upon the detection of sonar signals of the desired characteristics or patterns within the desired ranges.

There are instances, however, where it is advantageous to have the strobe camera equipment activated periodically, at a slow rate—say, every few minutes or so—for such purposes as acting as an attractant (light-flash or sounds or electric field or charging and discharging), or to make an occasional record of what is present in the monitored sector, even though the desired target is not yet present. When the sonar echoes of desired characteristics or pattern are detected, however, indicative that the desired object or scene is in the monitored sector, within desired ranges, it is imperative that there be enough energy left in the batteries or other power source of the apparatus to take the all-important pictures in rapid succession of the desired target, and for so long as that target is present. This requirement can be inconsistent with or thwarted by the continual slow rate monitoring operation, particularly if the desired target comes within range after the apparatus has been in operation for a substantial period of time and the energy source is low or near exhaustion.

To obviate such difficulties and more generally rather radically to improve upon the efficiency of this type of apparatus, while insuring adequate energy availability at the desired critical times, the techniques of the present invention were evolved; it being an object of the invention to provide a new and improved method of and apparatus for combined optical and acoustical monitoring and/or recording that shall not be subject to the above-described limitations but that, rather, will enable continual strobe-camera monitoring, for example, but with assurance that the apparatus can handle the critical recording when called upon to do so.

A further object is to provide a novel combined optical-acoustical monitoring apparatus and technique for more general applicability, as well.

Other and further objects will be explained hereinafter and are more fully delineated in the appended claims. In summary, however, from one of its important points of view, the invention involves a method of combined optical and acoustical recording, that comprises, periodically optically monitoring an underwater sector and recording the scenes therein at the times of said monitoring; acoustically monitoring said sector at least at said times and recording the monitored acoustical information in said sector; analyzing the acoustical information to determine if and when a predetermined acoustical pattern has been monitored; and, upon detecting the advent of such monitored predetermined pattern, changing the periodicity of the optical recording for so long as said acoustical pattern continues to be monitored. From a somewhat broader aspect, the invention also embraces a method of simultaneous monitoring and recording thereof with the aid of two different types of energy of widely different wavelengths and properties, that comprises, periodically monitoring a sector with one type of energy and recording the received scenes therein at the times of said monitoring; monitoring said sector at least substantially at said times with a second type of energy and recording the monitored information therefrom; analyzing said information to determine if and when a predetermined pattern has been monitored; and, upon detecting the advent of such monitored predetermined pattern, changing the periodicity of the monitoring and recording by said one type of energy for so long as said patern continues to be monitored. Preferred details and best mode embodiments are hereinafter presented.

The invention will now be decribed with reference to the accompanying drawing, the single FIGURE of which is a block circuit diagram of a preferred embodiment operating in accordance with the method underlying the invention.

Referring to the drawing, a sonar transceiver 1 is shown adapted to transmit acoustical impulses by the transducer array T into, for example, the water sector to the right, to reflect or echo the acoustical waves from objects or scenes therein and return signals to the receiver, indicating generally relative size and similar characteristics or patterns and range. Improved apparatus of this type is also described in U.S. Pat. No. 4,121,190 to Edgerton, Wyckoff and Rines. As fully disclosed in said U.S. Pat. No. 4,105,990, a target alarm detector (TAD) 3 with appropriate range and target size gating circuits, etc. can monitor and analyze the received sonar echo signals, looking for certain predetermined signal size patterns or other characteristics indicative of the desired objects, within desired range limits, and then activate an elapsed time camera (as of the type described in said Letters Patent or in U.S. Pat. No. 2,872,622, to H. E. Edgerton), shown at 5, to cause the triggering of a strobe light-flashing circuit 7 to record periodic pictures on the elapsed time camera film.

In accordance with the present invention, however, the timer 2 of the camera is provided with at least two speed settings; one, a very low speed timer (labelled "LO")—say one every few minutes—and secondly, a relatively high speed timer ("HI"), say one every second or two. The timer, as described in said patents and as is well known (such as the EG&G Geodyne Types 204 and 204B or as described by said Edgerton et al. in "An Elapsed-Time Photographic System for Underwater Use: Proceedings of the Eighth International Congress on High Speed Photography," John Wiley & Sons, 1968) causes the film-advance motor 4 to move a frame of the film in place at the shutter 6. The closing contacts of the shutter, as described in the above patents and publications, and schematically represented at C, apply a sync or trigger signal via 10 to trigger the grid G of the strobe lamp L, and cause the energy periodically charged from the batteries or other source S in the charging or energy storage circuit 9 (such as well-known resonant capacitor charging as described in said patents) to discharge between the anode A and cathode K of the strobe flash lamp L, producing a light flash directed to the right in the same sector, or part thereof, monitored by the sonar transducer array T. The lens L' of the elapsed time camera 5 is also pointing in said sector.

Much as the camera timer 2 is provided with relatively low and high-speed adjustments "LO" and "HI", selectable or changeable by switch $S_1$, as by energization and de-energization of an electromagnetic relay (or alternatively, an electronic switch) R1, so the charging or energy storage circuit 9 is provided with changeable "LO SPEED" and "HI SPEED" adjustments, such as different capacitor-resistance time-constant charging circuit elements, controllable by a synchronously operated switch $S_2$ and relay (or electronic switch) $R_2$. Thus, when occasional low-speed strobe flashing of the lamp 7 is produced, the film is advanced in synchronism in the elapsed time camera 5; and when a change to high-speed flashing is desired, the camera is advancing its film to keep pace, or vica versa. Clearly more sophisticated speed variations than just two low and high speed positions may be provided, if desired.

Turning now to the specific underwater monitoring applications before suggested, it is often desirable that a sonar record of what has been photographically recorded be made. This can be on chart recording paper (or video-recorded cathode-ray-tube display or the like) as described in several of the above-referenced patents; or, as illustrated in the preferred embodiment of this invention, it may be recorded on a magnetic tape recorder R for subsequent play-back and visual reconstruction, as is well known.

When the elapsed-time camera and its strobe-flashing operation are in the high-speed mode periodically slowly consuming energy therefor, it may be desired to correlate with the recording of sonar echoes at such times from the sector. This is shown effected by applying the flash-sync or trigger signal, controlled by the camera shutter contacts C in this illustration, along conductor 10' to a short-period holding circuit 13 (including, for example, a dash-pot-controlled relay $R_3$ or any other well-known short time delay holding circuit), which will hold a lower switch $S_3$ in lower position for a brief instant to supply operating voltage fed along 20 from the source S via conductors 14, to operate the tape drive motor ("DRIVE") of the recorder R. The corresponding acoustical signals monitored by the sonar 1 will therefore be fed at 12 to the recorder R and recorded therein only at the times the optical pictures are taken, again conserving energy in operating the recorder. This may involve analog-to-digital conversion of the received signals at their various ranges (as at A/D) or direct analog time signal recording.

When, however, the objects of the desired characteristics are detected and analyzed in the TAD unit 3 as being received, as explained in said U.S. Pat. No. 4,105,990, the output of TAD unit 3, via conductors 16, will hold the relay $R_3$ energized for so long as the desired acoustical signals are being received from said sector, correspondingly holding switch $S_3$ down and causing continual recording of the acoustical signals in the tape recorder R. By simultaneously feeding the TAD output at 16' to operate relay $R_1$ of the timer switch $S_1$ to hold the same in the "HI" position, and feeding the same output at 16" to control charging circuit relay $R_2$ and switch $S_2$ to actuate increased periodic speed flashing in the "HI SPEED" position, the increased periodicity rapid optical photographic recording in said sector will simultaneously occur, with the principal power drain coming only at this critical time period while the desired object is in the sector.

While the sonar is shown operating all the time, for further energy conservation, its operation could be confined (as by using switch $S_3$ also to control the application of voltage to the sonar) to the sampling times when the occasional picture is being taken by the camera 5 in the low-speed position, or to other periodic sampling time periods. The advent of the desired objects, as detected at such periods by the TAD unit 3 would cause the TAD output to apply the voltage to the pulses continuously so long as the desired objects were in the sector.

By this technique, therefore, relatively low power drain normally occurs during occasional strobe-camera flash pictures and corresponding sonar recording only at such times; but when the critical period of detection of the desired objects or scene occurs, as monitored by the sonar, rapid successive flash pictures that consume the bulk of the energy are only then initiated, as is continual sonar signal recording, and only for the critical time of continued presence of the desired objects in the monitored sector.

While the invention has been described with reference to the illustrative problem of such applications as underwater animal detection, clearly these techniques and apparatus are useful for a host of other optical-acoustical applications, underwater and in other media, such as air, where similar or related results are desired. Illustrative explanations in terms of sonar echoing, moreover, are not to be viewed as all-inclusive, since acoustical signals otherwise emanating from objects in the sector may be monitored; and the advent of the desired objects or scene may be otherwise detected. Similarly, the camera may have other illumination than the strobe. Though reference has been made to light in the visual spectrum, moreover, other forms of energy, such as infra-red or even microwave energy may also clearly be used; and the energy spectrum of the acoustical signals may also widely extend from audible to untrasonic waves; such that the invention, from its broadest aspect, is not to be restricted to the specific energy wavelengths or types illustratively described. Further modifications will also occur to those skilled in this art, and such are considered to fall within the spirit and scope of the invention as defined in the appended claims.

What is claimed is:

1. A method of combined optical and acoustical recording, that comprises, repetitively activating an optical device and thereby periodically optically monitoring an underwater sector and recording the scenes therein at the times of said monitoring; acoustically monitoring said sector at least at said times and recording the monitored acoustical information in said sector; analyzing the acoustical information to determine if and when a predetermined acoustical pattern has been monitored; and, upon detecting the advent of such monitored predetermined pattern, changing the periodicity of said activating for so long as said acoustical pattern continues to be monitored.

2. A method as claimed in claim 1 and in which the said periodicity is changed by increasing the same.

3. A method as claimed in claim 2 comprising, during the increased periodicity of optical monitoring, substantially continually effecting acoustical monitoring.

4. A method as claimed in claim 1 and in which the optical monitoring comprises periodically transmitting flashes of light within said sector to reflect from objects therein.

5. A method as claimed in claim 4 and in which the acoustical monitoring comprises periodically transmitting acoustical sonar impulses within said sector to reflect from objects therein.

6. A method as claimed in claim 5 and in which the acoustical recording comprises effecting recording for short time periods associated with the moments of periodic light flashing.

7. A method as claimed in claim 5 comprising substantially continually recording sonar information during the increased period of light flashing optical monitoring corresponding to continued sonar detection of the predetermined acoustical pattern.

8. A method as claimed in claim 7 and in which said analyzing comprises determining whether said acoustical pattern is a sonar echo pattern of predetermined characteristics within predetermined ranges.

9. A method of combined optical and acoustical monitoring, that comprises, repetitively activating an optical device and thereby optically monitoring a sector and recording scenes therein at desired sampling times; acoustically monitoring said sector at least at said times; analyzing the acoustical information to determine if and when a predetermined acoustical pattern has been monitored; and, upon detecting the advent of such monitored predetermined pattern, increasing the rate of said repetitive activating to effect rapid periodic optical recording within said sector.

10. A method as claimed in claim 9 and in which said rapid optical recording is accompanied by corresponding acoustical recording of the acoustically monitored information in said sector.

11. A method as claimed in claim 9 and in which said optical monitoring and recording is effected by strobe light flashes.

12. A method as claimed in claim 9 and in which the acoustical monitoring is effected by sonar ranging.

13. A method of simultaneous monitoring and recording with the aid of two different types of energy of widely different wavelengths and properties, that comprises, repetitively activating an optical device and thereby periodically monitoring a sector with one type of energy and recording the received scenes therein at the times of said monitoring; monitoring said sector at least substantially at said times with a second type of energy and recording the monitored information therefrom; analyzing said information to determine if and when a predetermined pattern has been monitored; and, upon detecting the advent of such monitored predetermined pattern, changing the repetitive rate of said activating and thereby changing the periodicity of the monitoring and recording by said one type of energy for so long as said pattern continues to be monitored.

14. A method as claimed in claim 13 and in which said monitoring and recording are performed with the aid of said one type of energy that is of wavelength much smaller than that of said second type of energy.

15. A method as claimed in claim 13 and in which the recording of the second type of energy comprises recording at the times of the first-named periodic monitoring by the said one type of energy; and, upon the advent of the predetermined pattern as monitored by the second type of energy, the recording of the second type of energy at the same times as the changed periodicity of the recording by the first type of energy.

16. A method as claimed in claim 15 and in which the monitoring and recording are performed with the aid of said first type of energy that is light energy, visible or invisible, and the second type of energy that is acoustical, audible or ultrasonic.

17. A method as claimed in claim 15 and in which said changing periodicity comprises increasing periodicity.

18. A method as claimed in claim 15 and in which the monitoring by the second type of energy comprises continually monitoring.

19. A method as claimed in claim 15 and in which the monitoring by the second type of energy comprises periodically monitoring.

20. Combined optical and sonar apparatus comprising a camera provided with means for periodically activating the same to record scenes in a predetermined sector; sonar means for contemporaneously probing said sector; means for analyzing the received sonar signals from said sector and means responsive to the detection of a predetermined acoustical pattern in the received sonar signals for thereupon changing the periodicity of the activation of the camera.

21. Apparatus as claimed in claim 20 and in which said changing means comprises means for maintaining the periodicity of camera activation changed for so long as the said predetermined acoustical pattern is received by the sonar means.

22. Apparatus as claimed in claim 20 and in which the said means for changing the periodicity of the camera activation comprises means for increasing periodicity.

23. Apparatus as claimed in claim 22 and in which means is provided for recording the received sonar signals during said increase in periodicity of the camera activation.

24. Apparatus as claimed in claim 20 and in which said camera comprises strobe means operable to effect the periodic activation.

25. Apparatus as claimed in claim 24 and in which means is provided for recording the received sonar signals at the times of the periodic strobe means flashing.

26. Apparatus as claimed in claim 24 and in which the means for changing comprises means for increasing the periodicity of the camera and the strobe means.

27. Apparatus as claimed in claim 26 and in which means is provided for recording said received sonar signals during the increased periodicity activation of said camera and its strobe means.

28. Apparatus as claimed in claim 20 comprises means for continually operating the sonar means.

29. Apparatus as claimed in claim 20 comprising means for periodically operating the sonar means.

* * * * *